United States Patent
Mikalsen et al.

(10) Patent No.: US 10,934,220 B2
(45) Date of Patent: Mar. 2, 2021

(54) CHEMICAL AND TOPOLOGICAL SURFACE MODIFICATION TO ENHANCE COATING ADHESION AND COMPATIBILITY

(71) Applicant: United Technologies Corportion, Farmington, CT (US)

(72) Inventors: Erik A. Mikalsen, Manchester, CT (US); James T. Beals, West Hartford, CT (US); Tania Bhatia Kashyap, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/998,736

(22) Filed: Aug. 16, 2018

(65) Prior Publication Data

US 2020/0055788 A1    Feb. 20, 2020

(51) Int. Cl.
| | | |
|---|---|---|
| *C04B 41/00* | (2006.01) | |
| *C04B 41/50* | (2006.01) | |
| *C04B 41/51* | (2006.01) | |
| *C04B 41/86* | (2006.01) | |
| *C04B 41/87* | (2006.01) | |

(Continued)

(52) U.S. Cl.
CPC ...... *C04B 41/0027* (2013.01); *B23K 26/0006* (2013.01); *B23K 26/355* (2018.08); *C04B 41/009* (2013.01); *C04B 41/0036* (2013.01); *C04B 41/0045* (2013.01); *C04B 41/0054* (2013.01); *C04B 41/5023* (2013.01); *C04B 41/5024* (2013.01); *C04B 41/5035* (2013.01); *C04B 41/5042* (2013.01); *C04B 41/5044* (2013.01); *C04B 41/51* (2013.01);

(Continued)

(58) Field of Classification Search
CPC ............ C04B 41/0027; C04B 41/0036; C04B 41/0045; C04B 41/0054; C04B 41/009; C04B 41/5023; C04B 41/5024; C04B 41/5035; C04B 41/0542; C04B 41/5044; C04B 41/51; C04B 41/86; C04B 41/87; C04B 41/88; C23C 26/00
See application file for complete search history.

(56) References Cited

U.S. PATENT DOCUMENTS 5,113,582 A * 5/1992 Monson .................. B23P 6/002
                                                                 29/889.2
5,580,837 A    12/1996 Dodds et al.
(Continued)

FOREIGN PATENT DOCUMENTS

DE    102015205807 A1    10/2016
EP        1044944 A1    10/2000
(Continued)

OTHER PUBLICATIONS

J. Kolitsch, H.J. Seifert, and F. Aldinger, "Phase Relationships in the Systems RE2O3—Al2O3—SiO2 (RE = Rare Earth Element , Y, and Sc)" Journal of Phase Equilibria, vol. 19, No. 5, 1998.
(Continued)

*Primary Examiner* — Michael P Wieczorek
(74) *Attorney, Agent, or Firm* — Bachman & LaPointe, P.C.

(57) ABSTRACT

A process of coating a substrate containing silicon with an environmental barrier coating, comprising altering a surface of the substrate and applying an environmental barrier layer to the surface of the substrate.

16 Claims, 2 Drawing Sheets

(51) Int. Cl.
　　*C04B 41/88*　　　(2006.01)
　　*B23K 26/00*　　　(2014.01)
　　*B23K 26/352*　　(2014.01)
(52) U.S. Cl.
　　CPC .............. *C04B 41/86* (2013.01); *C04B 41/87* (2013.01); *C04B 41/88* (2013.01)

(56) References Cited

U.S. PATENT DOCUMENTS

| | | | |
|---|---|---|---|
| 5,858,181 | A | 1/1999 | Jindal et al. |
| 6,117,560 | A | 9/2000 | Maloney |
| 6,210,812 | B1 * | 4/2001 | Hasz ............... C22C 38/005 416/241 B |
| 6,228,453 | B1 | 5/2001 | Fareed et al. |
| 6,270,852 | B1 | 8/2001 | Ulion et al. |
| 6,284,323 | B1 | 9/2001 | Maloney |
| 6,296,941 | B1 | 10/2001 | Eaton, Jr. et al. |
| 6,579,636 | B2 | 6/2003 | Oguri et al. |
| 6,730,422 | B2 | 5/2004 | Litton et al. |
| 6,924,040 | B2 | 8/2005 | Maloney |
| 7,063,894 | B2 | 6/2006 | Sun et al. |
| 7,226,672 | B2 | 6/2007 | Litton et al. |
| 7,509,735 | B2 * | 3/2009 | Philip .................. C23C 4/02 29/889.1 |
| 7,513,955 | B2 * | 4/2009 | Kruger ................ B08B 7/00 134/1 |
| 7,622,195 | B2 | 11/2009 | Schlichting et al. |
| 7,862,901 | B2 | 1/2011 | Darolia et al. |
| 7,951,459 | B2 * | 5/2011 | Tang ............... C04B 41/009 416/241 B |
| 7,972,657 | B2 | 7/2011 | Schlichting et al. |
| 8,039,113 | B2 | 10/2011 | Kirby et al. |
| 8,062,759 | B2 | 11/2011 | Fu et al. |
| 8,084,086 | B2 | 12/2011 | Hass et al. |
| 8,111,078 | B1 | 2/2012 | Yang et al. |
| 8,119,247 | B2 | 2/2012 | Kirby et al. |
| 8,216,689 | B2 | 7/2012 | Witz et al. |
| 8,217,087 | B1 | 7/2012 | Keller et al. |
| 8,257,559 | B2 | 9/2012 | Floyd et al. |
| 8,273,470 | B2 | 9/2012 | Kirby et al. |
| 8,287,635 | B2 | 10/2012 | Luccarelli et al. |
| 8,343,589 | B2 | 1/2013 | Kirby et al. |
| 8,357,454 | B2 | 1/2013 | Kulkarni et al. |
| 8,470,460 | B2 | 6/2013 | Lee |
| 8,512,874 | B2 | 8/2013 | Darolia et al. |
| 8,529,999 | B2 | 9/2013 | Maloney et al. |
| 8,574,721 | B2 | 11/2013 | Gero et al. |
| 8,658,255 | B2 | 2/2014 | Kirby et al. |
| 8,658,291 | B2 | 2/2014 | Kirby et al. |
| 8,663,378 | B2 | 3/2014 | Luccarelli et al. |
| 8,673,400 | B2 | 3/2014 | Kirby et al. |
| 8,940,417 | B2 | 1/2015 | Courcot et al. |
| 9,034,479 | B2 | 5/2015 | Nagaraj et al. |
| 9,126,873 | B2 | 9/2015 | Diss et al. |
| 9,387,512 | B2 * | 7/2016 | Lee ...................... B05D 5/005 |
| 9,428,650 | B2 | 8/2016 | 'Meschter et al. |
| 9,611,181 | B2 | 4/2017 | Tang et al. |
| 9,713,912 | B2 | 7/2017 | Lee |
| 9,771,811 | B2 | 9/2017 | Zhang et al. |
| 9,926,238 | B2 | 3/2018 | Louchet et al. |
| 9,938,839 | B2 | 4/2018 | Rosenzweig et al. |
| 9,951,630 | B2 | 4/2018 | Hass |
| 2006/0115659 | A1 | 6/2006 | Hazel et al. |
| 2008/0113218 | A1 | 5/2008 | Schlichting et al. |
| 2009/0155554 | A1 | 6/2009 | Gentleman et al. |
| 2010/0129636 | A1 | 5/2010 | Cybulsky et al. |
| 2010/0129673 | A1 | 5/2010 | Lee |
| 2010/0154422 | A1 | 6/2010 | Kirby et al. |
| 2011/0014060 | A1 | 1/2011 | Bolcavage et al. |
| 2011/0217560 | A1 | 9/2011 | Ridgeway |
| 2013/0122259 | A1 | 5/2013 | Lee |
| 2013/0260130 | A1 | 10/2013 | Taxacher et al. |
| 2014/0065408 | A1 | 3/2014 | Strock et al. |
| 2014/0272310 | A1 | 9/2014 | Lazur et al. |
| 2015/0118444 | A1 | 4/2015 | Lipkin et al. |
| 2015/0167141 | A1 | 6/2015 | Rozenweig et al. |
| 2015/0308276 | A1 * | 10/2015 | Kleinow ............... F01D 5/20 416/228 |
| 2016/0160664 | A1 | 6/2016 | Luthra et al. |
| 2016/0214907 | A1 | 7/2016 | Shim et al. |
| 2016/0332922 | A1 | 11/2016 | Tang et al. |
| 2017/0022113 | A1 | 1/2017 | Opila |
| 2017/0073278 | A1 | 3/2017 | Landwehr et al. |
| 2017/0121232 | A1 | 5/2017 | Nelson et al. |
| 2017/0145560 | A1 * | 5/2017 | Weaver ................ C04B 41/85 |
| 2017/0335118 | A1 | 11/2017 | Tang et al. |
| 2018/0347049 | A1 | 12/2018 | Oboodi et al. |
| 2018/0370862 | A1 | 12/2018 | Kirby et al. |

FOREIGN PATENT DOCUMENTS

| | | |
|---|---|---|
| EP | 1806431 A2 | 7/2007 |
| EP | 1900848 A2 | 3/2008 |
| EP | 2189504 A1 | 5/2010 |
| EP | 2192098 A1 | 6/2010 |
| EP | 2388354 A1 | 11/2011 |
| EP | 2615250 A1 | 7/2013 |
| EP | 2644747 A1 | 10/2013 |
| EP | 3409653 A1 | 12/2015 |
| EP | 3130577 A1 | 2/2017 |
| EP | 3162783 A1 | 5/2017 |
| WO | 2013103425 A2 | 7/2013 |
| WO | 2014204480 A1 | 12/2014 |
| WO | 2017031163 A1 | 2/2017 |
| WO | 20190269023 A1 | 4/2019 |

OTHER PUBLICATIONS

European Search Report dated Jan. 3, 2020 issued for corresponding European Patent Application No. 19192124.6.
European Search Report dated Dec. 6, 2019 issued for corresponding European Patent Application No. 19189903.8.
European Search Report dated Jan. 7, 2020 issued for corresponding European Patent Application No. 19192131.1.
European Search Report dated Jan. 13, 2020 issued for corresponding European Patent Application No. 19192162.6.
Poerschke, D.L., et al., "Interaction of yttrium disilicate environmental barrier coatings with calcium-magnesium-iron aluminosilicate melts", Acta Materialia, vol. 145, Dec. 19, 2017 pp. 451-461.
Ahlborg, N.L., et al., "Calcium-magnesium aluminosilicate (CMAS) reactions and degradation mechanisms of advanced environmental barrier coatings", Surface & Coatings Technology, vol. 237, (2013) pp. 79-87.
Zhao, H., et al., "Molten silicate reactions with plasma sprayed ytterbium silicate coatings", Surface & Coatings Technology, vol. 288, Jan. 14, 2016, pp. 151-162.
European Office action dated Mar. 7, 2018 issued for corresponding EP Patent Application No. 15168227.5.
Latka, et al. "Thermal diffusivity and conductivity of yttria stabilized zirconia coatings obtained by suspension plasma spraying", Surface & Coatings Technology 208 (2012), pp. 87-91, (Year 2012).
Fauchals, et al. "Understanding of Suspension DC Plasma Spraying of Finely Structured Coatings for SOFC", IEEE Transactions on Plasma Science, vol. 33, No. 2, Apr. 2005, pp. 920-930. (Year: 2005).
Qu, et al., "Thermal Conductivity of the gadolinium calcium silicate apatites: Effect of Different Point Defect Types", Acta Materialia vol. 59, (2011), pp. 3841-3850.
U.S. Non-final Office action dated Apr. 13, 2017 issued for corresponding U.S. Appl. No. 14/711,902.
U.S. Non-final Office action dated Aug. 1, 2019 issued for corresponding U.S. Appl. No. 14/711,902.
U.S. Final Office action dated Aug. 23, 2017 issued for corresponding U.S. Appl. No. 14/711,902.
U.S. Final Office action dated Dec. 11, 2019 issued for corresponding U.S. Appl. No. 14/711,902.

(56) References Cited

OTHER PUBLICATIONS

EP Search Report dated Sep. 28, 2015 issued for European Patent Application No. 15168227.5.
U.S. Non-final Office action dated Sep. 10, 2020 issued for corresponding U.S. Appl. No. 14/711,902.

* cited by examiner

CHEMICAL AND TOPOLOGICAL SURFACE MODIFICATION TO ENHANCE COATING ADHESION AND COMPATIBILITY

BACKGROUND

The disclosure relates to an article comprising a substrate containing silicon and an environmental barrier coating (EBC) which functions as a protective environmental barrier coating and inhibits the formation of gaseous species of Si, particularly $Si(OH)_x$ when the article is exposed to a high temperature, aqueous (water and/or steam) environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments.

It has been found that these silicon containing structures can recess and lose mass as a result of formation of volatile silicon species, particularly $Si(OH)_x$ and SiO when exposed to high temperature, aqueous environments.

It is believed that the process involves oxidation of the silicon-containing structure to form silica on the surface followed by reaction of the silica with steam to form volatile species of silicon such as $Si(OH)_x$. It would be highly desirable to provide an external barrier coating for silicon-containing substrates which would inhibit the formation of volatile silicon species, $Si(OH)_x$ and SiO, and thereby reduce recession and mass loss.

SUMMARY

In accordance with the present disclosure, there is provided a process of coating a substrate containing silicon with an environmental barrier coating, comprising altering a surface of the substrate; and applying an environmental barrier layer to the surface of the substrate.

In another and alternative embodiment, the substrate comprises a ceramic matrix composite material.

In another and alternative embodiment, the altering step comprises at least one of a chemical process and a physical process.

In another and alternative embodiment, the surface is exposed to at least one of an intense ultraviolet light, a plasma, a laser, ion beam, and electron beam.

In another and alternative embodiment, the altering step comprises at least one of altering a chemical structure of the surface and altering a chemical function of the surface.

In another and alternative embodiment, the surface has organic contaminants, and wherein the altering step removes the organic contaminants.

In another and alternative embodiment, the substrate comprises at least one of a turbine vane and a turbine blade.

In another and alternative embodiment, the process further comprises applying a protective layer on the environmental barrier layer.

In another and alternative embodiment, the altering step comprises modifying textures of the surface through at least one of a chemical exposure, a physical addition of material, a physical removal of material; wherein the texture modification results in a surface topology.

In another and alternative embodiment, the surface topology can be created by at least one of embedding particles into the surface, directional deposition and mechanical removal of surface material.

In another and alternative embodiment, the mechanical removal comprises at least one of creating divots in the surface, creating lines in the surface.

In another and alternative embodiment, the divots and the lines can be arranged in at least one of patterns and randomly arranged.

In another and alternative embodiment, the process further comprises creating the surface topology by mechanical removal of material by at least one of a particle ablation, a laser ablation and chemical etching.

In another and alternative embodiment, the process further comprises utilizing a contact mask for isolating a predetermined area for adhesion of the environmental barrier coating.

In another and alternative embodiment, the process further comprises utilizing a contact mask for isolating a predetermined area for promoting chemical vapor infiltration growth during coating.

In another and alternative embodiment, the surface topology comprises characteristics that enhance bonding.

In another and alternative embodiment, the characteristics that enhance bonding are selected from the group consisting of a chemical uniformity, OH or Cr—Si group activity and a surface tortuosity, roughness and angularity.

In another and alternative embodiment, the surface tortuosity comprises at least one of a roughness and angularity.

In another and alternative embodiment, the surface topology is one of pre-determined in particular patterns, or randomly arranged.

In another and alternative embodiment, the environmental barrier layer comprises an oxidant getter phase, the oxidant getter phase is selected from the group consisting of silicon oxycarbide and elemental silicon.

In another and alternative embodiment, the environmental barrier layer comprises at least one of (rare earth) RE-monosilicates, disilicates and (alkaline earth) AE alumino silicates, silicates of Hafnium and zirconium, and oxides of Hafnium or zirconium.

In another and alternative embodiment, the environmental barrier layer comprises an oxide matrix and an oxidant getter phase interspersed throughout the oxide matrix, the oxide matrix contains a self-healing phase that contains at least one of doped silicates, compatible metals/metal alloys, non-oxide glasses, silica, and glass/glass ceramics comprising BAS, BMAS, LAS, SAS.

Other details of the coating are set forth in the following detailed description and the accompanying drawings wherein like reference numerals depict like elements.

DETAILED DESCRIPTION

Figure 1:
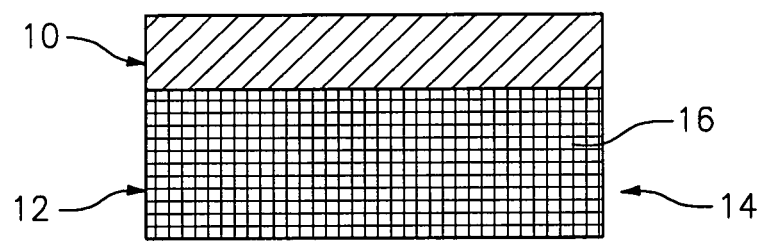
FIG. 1 is a cross section of an exemplary coating on a substrate containing silicon according to the disclosure.

Referring now to FIG. 1, there is illustrated an environmental barrier coating 10 formed over a substrate 12 of an article 14, configured to inhibit the formation of gaseous species of silicon when the article 14 is exposed to a high temperature, aqueous environment. The substrate 12 can be associated with articles 14 such as, at least one of a turbine vane and a turbine blade, and particularly a gas turbine engine component, such as components in the hot section of the gas turbine engine, including static and rotating components and portions of combustors, and the like.

The substrate 12 can be constructed from materials containing silicon and can be a ceramic matrix composite material, a monolithic ceramic, a silicon-based or silicon-containing ceramic substrate or a silicon-containing metal alloy. In an exemplary embodiment, the substrate 12 can be silicon-containing ceramic material such as, for example, silicon carbide, silicon nitride, silicon oxy-nitride and silicon aluminum oxy-nitride, alkaline earth or rare earth silicate glasses or glass ceramics and combinations thereof. Examples can include barium strontium alumino silicate, strontium alumino silicate, lithium alumino silicate, aluminosilicate, mullite, yttrium silicate, ytterbium silicate, and the like. In accordance with a particular embodiment, the silicon-containing ceramic substrate comprises a silicon-containing matrix with reinforcing materials 16 such as fibers, particles and the like and, more particularly, a silicon based matrix which is fiber-reinforced. Particularly suitable ceramic substrates are a silicon carbide fiber-reinforced silicon carbide matrix, a carbon fiber-reinforced silicon carbide matrix and a silicon carbide fiber-reinforced silicon nitride matrix. Particularly useful silicon-metal alloys for use as substrates for the article 14 can include molybdenum-silicon alloys, niobium-silicon alloys, iron-silicon alloys, zirconium, hafnium, titanium, chromium, tungsten, boron, platinum, tantalum, Ti—Si alloys and Mo—Si, Nb—Si and Fe—Si alloys.

Figure 2:
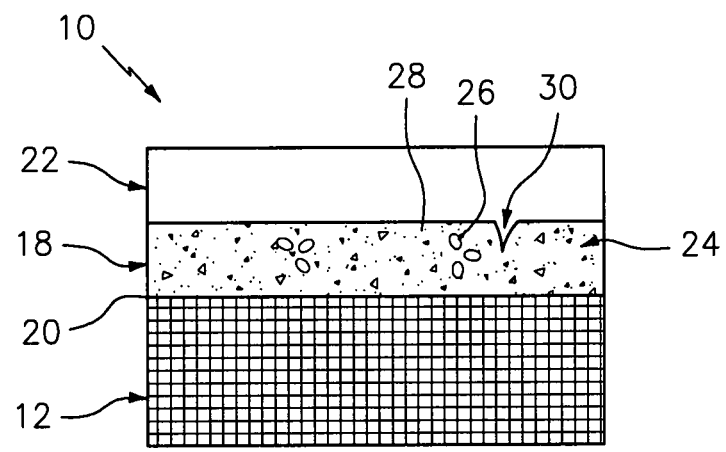
FIG. 2 is a cross section of an exemplary coating on a substrate containing silicon according to the disclosure.

Referring also to FIG. 2, an environmental barrier layer 18 can be applied to the substrate 12 on a surface 20. A protective layer 22 can be applied on the environmental barrier layer 18. The protective layer 22 is configured to resist recession of the Si-containing volatile species when exposed to water vapor or steam. In an exemplary embodiment, the protective layer 22 can include binary or multi-component oxides such as HfO2, ZrO2, or Gd2Hf2O7, Gd2Zr2O7, refractory metal oxides. In other exemplary embodiments, the protective layer 22 can include silicates with low(er) SiO2 activities. In another exemplary embodiment the protective layer 22 can include (rare earth) RE-monosilicates, disilicates and (alkaline earth) AE alumino silicates, silicates of Hafnium and zirconium.

The environmental barrier layer 18 can include an oxide matrix 24 and an oxidant getter phase 26 interspersed throughout the oxide matrix 24. The oxide matrix 24 can include a multi-phase mixture, such as $SiO_2$ rich phase and a self-healing phase 28 that can include a glass phase.

In an exemplary embodiment, the composition of the oxide matrix 24 dictates the mole fraction of the glass and the $SiO_2$. The self-healing phase 28 can include a material having properties that are in thermodynamic equilibrium with $SiO_2$ during operation at predetermined temperatures. The self-healing phase 28 comprises a material having properties of flowing into cracks 30 formed in the matrix 24 during operation at those predetermined temperatures. The self-healing phase 28 can be sufficiently fluid at high temperatures to flow into the cracks 30 in the coating 10, which imparts a self-healing functionality. In an exemplary embodiment, the self-healing phase 28 can include doped silicates, compatible metals/metal alloys, non-oxide glasses, the SiO2 itself, as well as any representative glass/glass ceramics such as BAS, BMAS, LAS, SAS.

The environmental barrier layer 18 can be present on the substrate 12 at a thickness of greater than or equal to about 0.5 mils (0.0005 inch), preferably between about 3 to about 30 mils and ideally between about 3 to about 5 mils.

In an exemplary embodiment the oxidant getter phase 26 can comprise, silicon oxycarbide, $Si_xO_yCz$ where $0.5 \leq x < 1$; $0 \leq y < 2$; $0 \leq z < 2$. In another exemplary embodiment, the oxidant getter phase comprises elemental silicon. The composition can include up to 100% silicon. The elemental silicon can improve coating adhesion.

It is advantageous to apply the environmental barrier layer 18 to the surface 20 of the substrate 14 after the surface 20 has been treated and prepared. The surface can have organic contaminants. The organic contaminants can be removed from the surface 20 via techniques, such as, plasma treatment. In order to obtain good adhesion of the environmental barrier layer 18 to the surface 20 it can be advantageous to enhance the properties of the surface 20.

Figure 3:
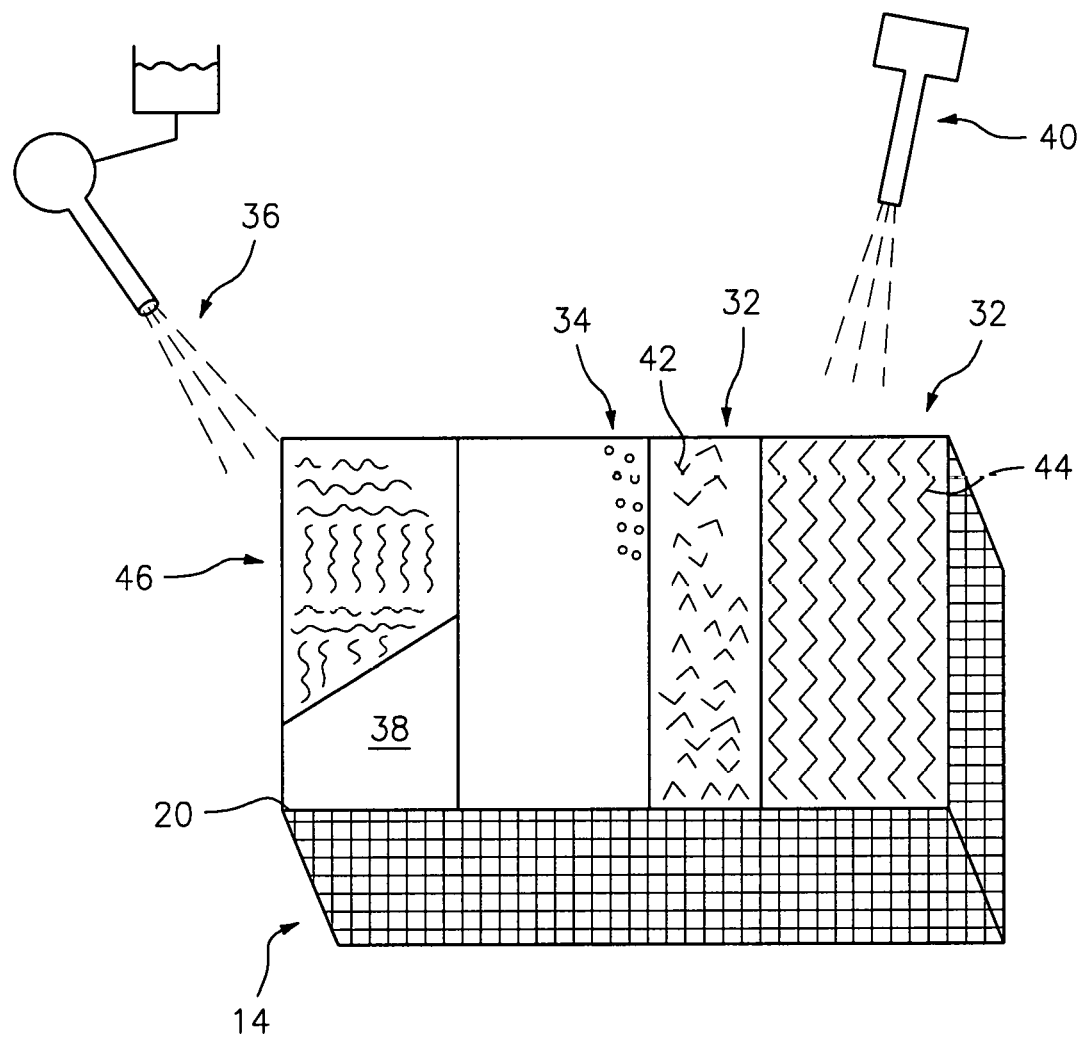
FIG. 3 is a perspective schematic view of an exemplary surface of the substrate containing silicon according to the disclosure.

Referring also to FIG. 3, in an exemplary embodiment the surface 20 can be altered through use of exposure of the surface 20 to at least one of a chemical process or a physical process. It is contemplated that one can positively change surface morphology with a combination mechanical/chemical treatment.

In an exemplary embodiment, the surface 20 can be exposed to an intense ultraviolet light, a plasma, a laser, ion beam, or electron beam. The exposure can alter the surface 20 by at least one of chemical structure or chemical function. It is also contemplated that the surface 20 can be etched to modify the properties of the surface 20.

In addition to the chemo-alteration of the surface 20, the surface 20 can have a texture modified through at least one of a chemical exposure, physical addition of material, physical removal of material resulting in a surface topology 32 that can enhance or enable adhesion of the environmental barrier layer 18.

In an exemplary embodiment, the surface topology 32 can be created by embedding particles 34, by directional deposition 36, with/without a mask 38, and mechanical removal of surface material. The mechanical removal 40 can include the creation of divots 42 or lines 44 in patterns or randomly arranged.

In another exemplary embodiment, the surface topology 32 can be created by mechanical removal 40 of material by particle ablation, laser ablation, chemical etching, and the like.

The contact mask 38, can be utilized for isolating a predetermined area for adhesion 46 and/or for promoting chemical vapor infiltration growth during coating.

The surface topology 32 can include characteristics that enhance bonding, such as chemical uniformity, OH or Cr—Si group activity, surface tortuosity, such as, roughness and angularity. The surface topology 32 can be pre-determined in particular patterns, such as a herring bone, or other pattern, or randomly arranged as shown in FIG. 3.

In an exemplary embodiment, the surface 20 of the composite to be coated is made via a CVI process, mechanically roughening the surface prior to a final CVI treatment that creates enhanced roughness resulting in significantly better adherence of the environmental barrier layer 18.

The environmental barrier layer 18 can be applied to the substrate 12 by use of suspension plasma spray, electron-beam physical vapor deposition, or an air plasma spray, as well as, slurry based method including dipping, painting and spraying.

The disclosed method can create a surface 20 that promotes strong adhesion that enables the capability of the environmental barrier coating system to endure higher thermal gradients, retain larger coating thickness design space, longer coating life, and higher resistance to spallation.

There has been provided a method of preparing a surface for an environmental barrier coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of coating a substrate containing silicon with an environmental barrier coating, comprising:
    mechanical removal of material comprising at least one of creating divots in said surface, creating lines in said surface, wherein the divots and the lines are arranged in patterns;
    altering a surface of said substrate, by modifying a texture of said surface through a physical addition of material wherein said texture modification results in a surface topology wherein said surface topology is created by embedding particles into said surface by directional deposition;
    exposing said surface to a plasma; and
    applying an environmental barrier layer to said surface of said substrate.

2. The process of claim 1, wherein said substrate comprises a ceramic matrix composite material.

3. The process of claim 1, wherein said altering step comprises a physical process.

4. The process of claim 1, further comprising: at least one of altering a chemical structure of said surface and altering a chemical function of said surface.

5. The process of claim 1, wherein the surface has organic contaminants, further comprising: removing the organic contaminants.

6. The process of claim 1, wherein said substrate comprises at least one of a turbine vane and a turbine blade.

7. The process of claim 1, further comprising:
    applying a protective layer on said environmental barrier layer.

8. The process of claim 1, further comprising:
    utilizing a contact mask for isolating a predetermined area for adhesion of said environmental barrier coating.

9. The process of claim 1, further comprising:
    utilizing a contact mask for isolating a predetermined area for promoting chemical vapor infiltration growth during coating.

10. The process of claim 1, wherein said surface topology comprises characteristics that enhance bonding.

11. The process of claim 10, wherein said characteristics that enhance bonding are selected from the group consisting of a chemical uniformity, OH or Cr—Si group activity and a surface tortuosity, roughness and angularity.

12. The process of claim 11, wherein said surface tortuosity comprises at least one of a roughness and angularity.

13. The process of claim 1, wherein said surface topology is pre-determined in particular patterns.

14. The process of claim 1, wherein said environmental barrier layer comprises an oxidant getter phase, said oxidant getter phase being selected from the group consisting of silicon oxycarbide and elemental silicon.

15. The process of claim 1, wherein said environmental barrier layer comprises at least one of (rare earth) RE-monosilicates, disilicates and (alkaline earth) AE alumino silicates, silicates of Hafnium and zirconium, and oxides of Hafnium or zirconium.

16. The process of claim 1, wherein said environmental barrier layer comprises an oxide matrix and an oxidant getter phase interspersed throughout the oxide matrix, the oxide matrix contains a self-healing phase that contains at least one of doped silicates, compatible metals/metal alloys, non-oxide glasses, silica, and glass/glass ceramics comprising BAS, BMAS, LAS, SAS.

* * * * *